April 16, 1963
M. BOURGEAUX ET AL
3,085,474
ARTICLES MADE OF A TRANSPARENT MATERIAL SUCH AS GLASS
SHEET, BRICKS OR BLOCKS, AND HAVING VARIABLE
TRANSPARENCY OR COLORATION
Filed July 8, 1958
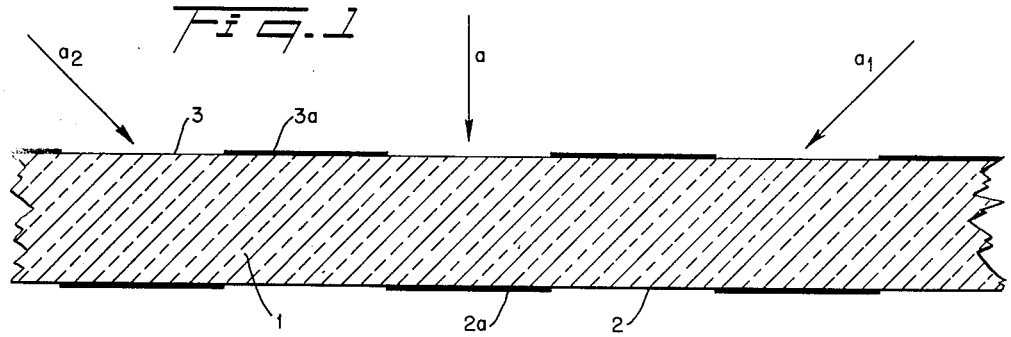
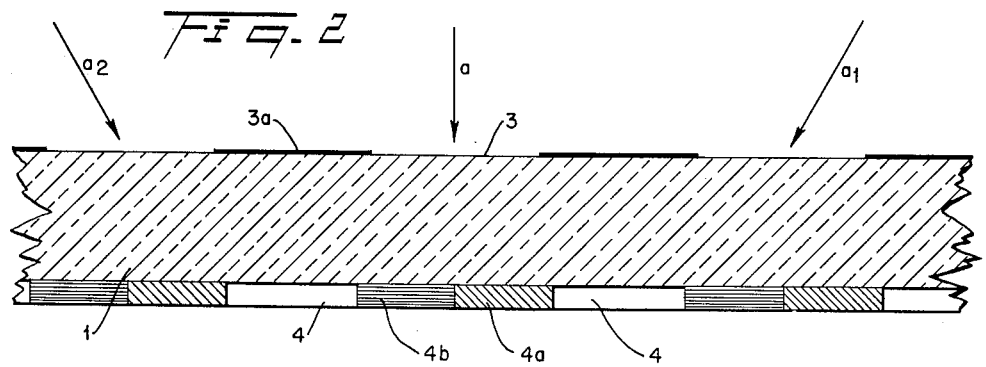
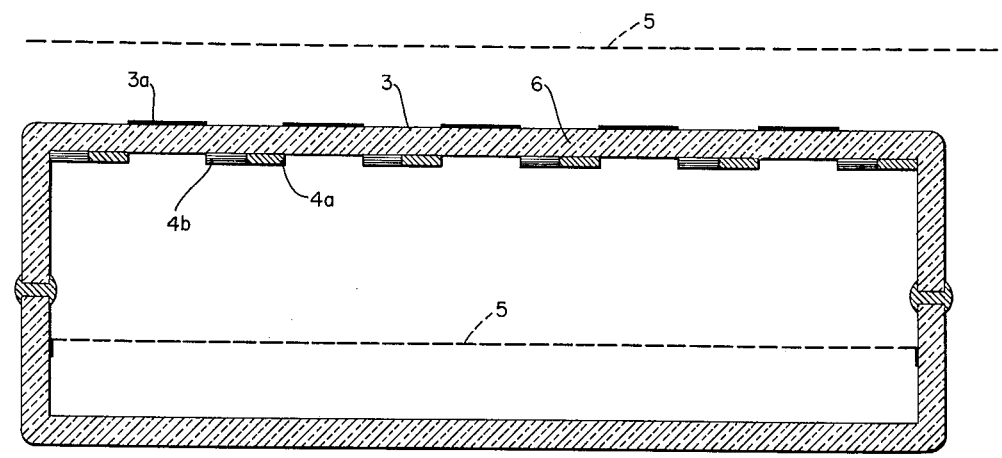
INVENTORS
MAURICE BOURGEAUX
FRANCIS NAUDIN
BY *Bauer and Seymour*
ATTORNEYS 3,085,474
ARTICLES MADE OF A TRANSPARENT MATERIAL SUCH AS GLASS SHEETS, BRICKS OR BLOCKS, AND HAVING VARIABLE TRANSPARENCY OR COLORATION
Maurice Bourgeaux and Francis Naudin, Paris, France, assignors to Compagnie de Saint-Gobain, Paris, France
Filed July 8, 1958, Ser. No. 747,165
Claims priority, application France July 10, 1957
7 Claims. (Cl. 88—60)

The present invention relates to articles made of a transparent material especially glass sheets, blocks or bricks and having a transparency or a coloration which varies in function of the incidence of the striking light beams.

According to the invention a transparent article such as a glass sheet, a glass block or a glass brick, comprises a back face divided in parallel strips of different transparencies and a front face similarly divided in strips parallel to the strips of the back face which are so constituted and spaced as to determine in function of the incident angle of the striking light rays, the strips of the back face reached by these light rays after passage through said sheet.

A further object of the invention is the application of such glass sheets, glass blocks or glass bricks as glazings. In this case the strips of the two faces may be of the same width and placed vertically in quincunx. When the light beams are in vertical planes perpendicular to the surface of such a glazing, they pass between the strips of the front face and are stopped by the strips on the back face. On the contrary beams travelling in oblique planes with respect to the glazing, may pass between the strips of the back face. If such glazing is southerly exposed the shadow zone will be continuous at noon; and the glazing will transmit alternatively light and shaded zones in the morning and in the evening, shadow zones being increased or reduced when the sun draws nearer or moves off from zenith.

In carrying out the present invention such a glazing may be made in laying out in quincunx on the two faces of a transparent sheet such as glass sheets, or on the two faces of one wall of a glass block or of a brick, strips of more or less opaque material; the strips may be constituted by an aluminium sheet or by finely divided aluminium projected on the glass surfaces, paints or enamels, etc.

Especially when said sheets or bricks are utilized as glazings, it is possible to contemplate the following dispositions to allow the reduction of the lighting ratio or contrast between the shaded and the lighted zones:

(a) Semi-transparent or diffusing strips obtained for example by superficial etching of the glass surfaces (sand blasting for example) may be utilized instead of opaque strips.
(b) The edges of the strips can be cut out or notched, or the strips can be constituted in the form of squarings disposed in check patterns.
(c) Between the glazing and the observer can be placed a material diffusing the light, for example a glass fiber veil or a ribbed sheet of glass etc.
(d) Several strips reflecting the light can be placed on one face, the others on the opposite face in view to gather on the observer side the direct radiation together with several reflected radiations.

According to the invention in order to obtain light effects of variable coloration the strips may be of various colorations so that the light beams pass through strips of different colorations in function of the inclination of the incident light beams, said sheets, blocks or bricks may be, especially, utilized as glazings, the strips of the back face being variously stained to obtain the following effects:

From the rising of the sun to the end of forenoon: stainings corresponding to the upper part of the colors spectrum that is: yellow, orange, red, purple,
From the end of forenoon to the beginning of afternoon: a darkening,
From the beginning of afternoon to the evening: stainings corresponding to the lower part of the colors spectrum: purple, blue, green.

Other advantages and characteristics of the invention will appear from the following description relating to forms of realizations given only as examples.

In said description relating to the drawings:
FIG. 1 is a cross section of a glass sheet according to the invention.
FIG. 2 is a cross section of a glass sheet of variable coloration.
FIG. 3 is a cross section of a glass brick of variable coloration.

In FIG. 1 the back face of a sheet 1 of transparent material, for example a glass sheet, is divided in parallel strips 2—2a of different transparencies and the front face equally divided in parallel strips 3—3a of different transparencies. These various strips are placed in lateral offset or quincunx relationship, as shown.

The strips 2 and 3 may be constituted by the surface of the sheet and keep the transparency of said sheet. The strips 2a and 3a may be more or less opaque and constituted by metal film in sheet or powder, stains, enamel, etc.

If the width of said strips is the same, it appears that a light beam of direction $a$ striking a strip 3 of the front face and contained in a plane normal to said face and parallel to the direction of the strips will reach a strip 2a of the back face. Said beam will then be stopped if strips 2a are opaque.

Any light beam of directions $a_1$ or $a_2$ inclined with respect to direction $a$ and passing between the strips 3a will reach a transparent strip 2 and then go out of the sheet.

The FIG. 2 represents a sheet having a back face provided with strips of various colorations. In the present case said strips comprise strips 4, yellow for example, facing the opaque strips 3a of front face, and strips 4a—4b respectively red and blue facing the transparent strips 3 of said front face.

A diffusing screen 5 is provided opposite the back face.

When the light beams strike the front face 3 according to direction $a$, said light beams go out with a purple color (mixing of red and blue). When the beams strike the front face according to an inclined direction $a_1$, said beams go out with blue, green or yellow color, according to the degree of slope. When the beams travel according to an inclined direction $a_2$ they go out colored in yellow, orange, red with respect to the inclination degree.

FIG. 3 represents a glass block according to the invention. The wall 6 of said block comprises strips disposed in conformity with the invention. The strips may be disposed as in FIG. 2 and are constituted, on the front face, by opaque strips 3a and on the back face by colored strips 4a—4b, red or blue for example, facing the transparent strips 3. A diffusing screen 5 may be disposed inside the block.

What is claimed is:
1. A glazing for use in a building for the transmission of light from a moving source of illumination having bounding surfaces lying side by side, one surface of the glazing comprising first, fixed parallel strips of similar width and of different light-transmitting properties which receive light of varying angles of incidence, divide it into bands, and direct the bands toward the opposite surface of the glazing, said opposite surface of the glazing being divided into a plurality of sets of second parallel repetitively arranged strips, extending parallel to and in fixed staggered relation to the first strips, which have different light-modifying and controlling properties, each pair of successive first strips on the surface of the glazing which receives incident light lying in lateral offset to a set of successive second strips on said opposite surface of the glazing, whereby light received by the light-transmitting surface is transmitted through the glazing with modification imposed by the controlling strips in accordance with the varying angle of incidence of the light.

2. A glazing in accordance with claim 1, wherein the second strips, on the opposite surface of the glazing, have a plurality of different colorations in repetitive sequence.

3. A glazing in accordance with claim 2, wherein alternate first strips, on the said one surface of the light-transmitting glazing receiving incident light, are at least substantially opaque and the other first strips on said one surface are transparent.

4. A glazing in accordance with claim 1, wherein the second strips, on the opposite surface of the glazing includes transparent strips, the transparent strips being disposed between successive sets of colored strips.

5. A glazing in accordance with claim 4, wherein the opaque first strips are disposed at least substantially directly opposite the transparent second strips, whereby the glazing permits the transmission of a large amount of natural light when the incident light rays are inclined to the glazing in the morning and in the evening, and the amount of natural light transmitted through the glazing is substantially reduced when the incident light rays are perpendicular to the glazing at noon.

6. A glazing in accordance with claim 5, wherein the opaque first strips have a width which substantially equals the width of the transparent second strips.

7. A glazing according to claim 1 in which the secondary strips are formed of a plurality of parallel differently colored strips.

References Cited in the file of this patent

UNITED STATES PATENTS

| | | |
|---|---|---|
| 1,227,462 | Luckiesh | May 22, 1917 |
| 1,800,044 | Baird | Apr. 7, 1931 |
| 1,816,112 | Deisch | July 28, 1931 |
| 2,009,167 | Delano | July 23, 1935 |
| 2,059,489 | Reisig | Nov. 3, 1936 |
| 2,205,523 | Galey | June 25, 1940 |
| 2,280,358 | Tietig | Apr. 21, 1942 |
| 2,617,329 | Dreyer | Nov. 11, 1952 |
| 2,661,391 | Bedford | Dec. 1, 1953 |
| 2,703,486 | Ford | Mar. 8, 1955 |
| 2,714,816 | Pennell | Aug. 9, 1955 |
| 2,858,734 | Boyd | Nov. 4, 1958 |
| 2,888,007 | Tabor | May 26, 1959 |